Oct. 17, 1950 — E. L. WALTERS — 2,525,980
PRESS FOR LAMINATING SAFETY GLASS
Filed Nov. 19, 1948 — 3 Sheets-Sheet 1

Inventor
Emmett L. Walters
By Nobbe & Swope
Attorneys

Oct. 17, 1950 — E. L. WALTERS — 2,525,980
PRESS FOR LAMINATING SAFETY GLASS
Filed Nov. 19, 1948 — 3 Sheets-Sheet 2

Inventor
Emmett L. Walters
By Nobbe & Swope
Attorneys

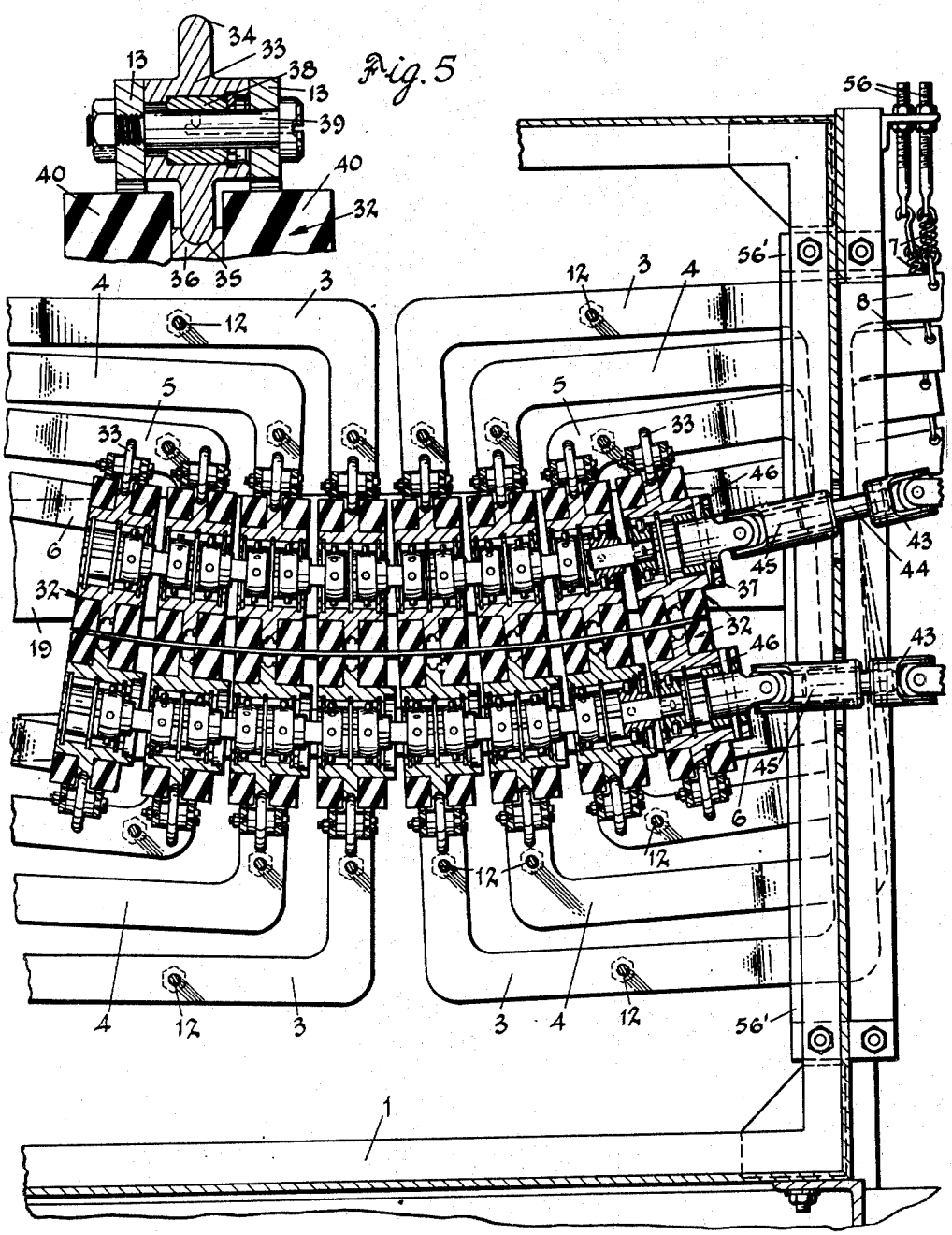

Patented Oct. 17, 1950

2,525,980

UNITED STATES PATENT OFFICE 2,525,980

PRESS FOR LAMINATING SAFETY GLASS

Emmett L. Walters, Toledo, Ohio, assignor to Libbey-Owens-Ford Glass Company, Toledo, Ohio, a corporation of Ohio Application November 19, 1948, Serial No. 60,959

11 Claims. (Cl. 154—2.7)

The invention relates to apparatus for use in the manufacture of laminated glass and in particular to apparatus for pressing the layers of a glass and plastic sandwich into intimate contact with each other during the assembly of a laminated glass article.

Laminated glass, commonly known as "safety" glass is a composite assembly of one or more plastic interlays interposed between and bonded to two or more sheets of glass. In the manufacture of laminated glass it is necessary to exclude all traces of air and moisture from the space between the sheets of glass and plastic interlays so that the resulting composite sheets of laminated glass shall be free from visible defects. It is customary in the manufacture of such glass to pass the freshly assembled sandwiches between rubber faced rollers similar except for size to the wringer rolls of a washing machine in order that such rollers may, by the pressure exerted by the faces of the sandwich, drive all air and moisture toward the edges and from the space between the glass sheets. Relatively simple machines patterned after a washing machine wringer are satisfactory for this purpose as long as the glass sheets are flat. They are entirely unsuited for the processing of curved glass sheets except cylindrical sheets that can be passed through the machine with the axis of the cylindrical shape parallel to the axis of the rollers. These machines, as customarily constructed, can not accommodate transverse curvature in the glass, particularly if such transverse curvature varies along the length of the glass being laminated.

The principal object of this invention is to provide a roller press having a plurality of rollers adapted to supply pressing forces against opposite sides of a glass and plastic sandwich which rollers are mounted so that they may, in pairs, shift in position relative to adjacent rollers to accommodate transverse curvature of a glass and plastic sandwich being passed between the rollers.

Another object of the invention is to provide a plurality of roller-faced generally C-shaped clamps that are individually resiliently supported so that they may shift in a plane transverse to the path of the glass and plastic sandwich being processed to accommodate changes in transverse curvature of the glass as it passes between the rollers.

A still further object of the invention is to provide a plurality of rollers distributed in two series in which the rollers of each series are interconnected by universal connections forming driving connections therebetween and in which the rollers taken in pairs one from each series are held in cooperative relation by individually supported frames that permit by their individual movement each pair of rollers to conform to the transverse curvature of a sheet of glass being passed therebetween.

An ancillary object of the invention is to include in each of the individually supported frames a resilient connection or member the resiliency of which accommodates differences in thickness of the glass and plastic sandwich being passed between the rollers so as to maintain substantially constant pressure against such sandwich and which further permits adjustment of such pressure.

More specific objects and advantages are apparent from the following description of an improved roller press for use in pressing glass and plastic sandwiches in the manufacture of laminated glass.

According to the invention a plurality of rollers each of which is preferably faced with a resilient material to avoid local concentration of pressure are arranged in two series and are supported and driven to apply pressure to a glass and plastic sandwich passed between the two series of rollers. The rollers are each universally connected to its neighbor so that each series may be power driven. The rollers are supported in pairs, one from each series, by a plurality of individually resiliently supported frames that urge the rollers toward each other with a force sufficient to provide preliminary bonding or adhesion of the sheets, which force exceeds the force required to shift a roller and frame assembly as a unit. This structure thus permits high pressing pressure to be applied to a glass and plastic sandwich without producing a bending stress tending to break the glass. An additional feature of the invention is that the individual frames are, in the region of the roller acting against the concave side of the glass sheet, guided for motion along a line generally perpendicular to the surface of the glass. The frame as a whole is resiliently supported and guided so that by translation it may accommodate changes in transverse curvature and by rotation about its guiding point may align itself with the glass so that the rollers carried thereby exert substantially equal pressure throughout their area of contact with the glass and do not exert excessive bending stress on the glass.

Briefly the structure resembles a plurality of C-shaped clamps each of which journals a pair of rollers which together close the open side of the clamp and in which a plurality of such roller-clamp assemblies are connected with the rollers in alignment and embracing the path along which the glass sandwiches are passed. The aligned rollers are in driving connection with each other and externally driven to facilitate the passage of glass between the rollers.

A glass and plastic sandwich pressing apparatus embodying the features of the invention is illustrated in the accompanying drawings.

In the drawings:

Figure 4 is an enlarged vertical transverse section as seen from the line 4—4 of Figure 3 showing the cooperation between the rollers as they apply force to a curved glass and plastic sandwich.

Figure 5 is an enlarged fragmentary detail showing the support for one of the rollers.

Figure 1:
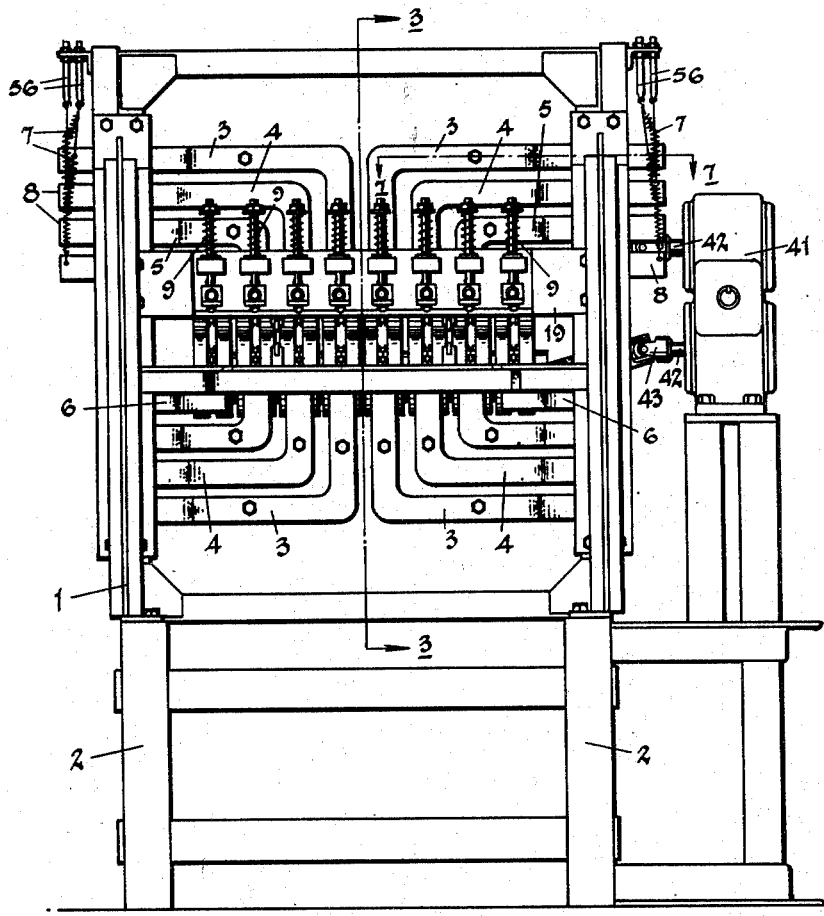
Figure 1 is an elevation of the improved apparatus looking in the direction of travel of the glass and plastic sandwiches to be processed.

These specific figures and the accompanying description are intended merely to illustrate the invention but not to limit its scope.

In the manufacture of laminated glass the glass and plastic sandwiches are laid up by hand and then the sandwiches are passed through a press that effects a partial bonding between the glass and plastic and that also drives any air or moisture from the space between the glass and plastic. After such pressing the glass sandwiches are placed in an autoclave and subjected to high temperatures and pressures for a sufficient time to effect intimate bonding between the glass and the plastic interlays. The improved press shown in the drawings is used to effect the initial adhesion between the glass and the plastic. This press, which may be located at the end of a conveyor line on which the glass is assembled, comprises a substantially rectangular framework 1 arranged transversely at the end of the conveyor and set on a pedestal or base 2 of such height that the intermediate portion of the framework 1 is level with the conveyor.

A plurality of generally C-shaped frames 3, 4, 5 and 6 are guided in the framework 1 and are supported in part by a plurality of springs 7 attached to projections 8 extending from the frames 3, 4, 5 and 6. The other ends of the C-shaped frames are supported by springs 9 in a construction that is fully shown in Figure 3.

Figures 2, 7:
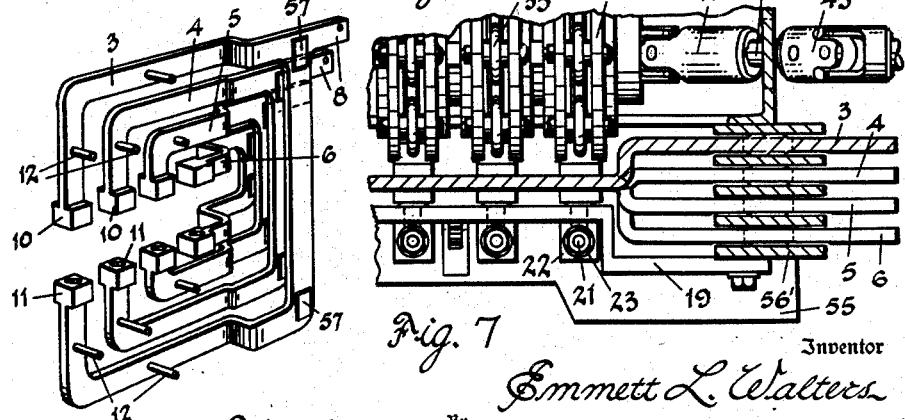
Figure 2 is a perspective view showing the nesting arrangement of a plurality of C-shaped frames that are used to support the rollers.
Figure 7 is a horizontal section taken substantially along the line 7—7 of Figure 1 showing the guiding arrangement for the roller carrying frames.

From Figure 2 it may be noticed that the ends of the C-shaped frames 3, 4 and 5 facing the opening between the arms are each provided with enlarged jaws 10 and 11. The individual frames 3, 4, 5 and 6, there being four of each, are arranged in pairs and the corresponding members of each pair are tied together by spacer bolts 12 that extend in a direction parallel to the path of the glass sandwich passing through the press. Thus the four sets of C-shaped frames 3, 4, 5 and 6, one of which is shown in Figure 2, are tied together in pairs with one such pair of sets extending in from one side of the path of the glass to partially embrace such path and with the other set extending in from the other side of the path to embrace its side of the path of the glass.

Figures 3, 6, 8:
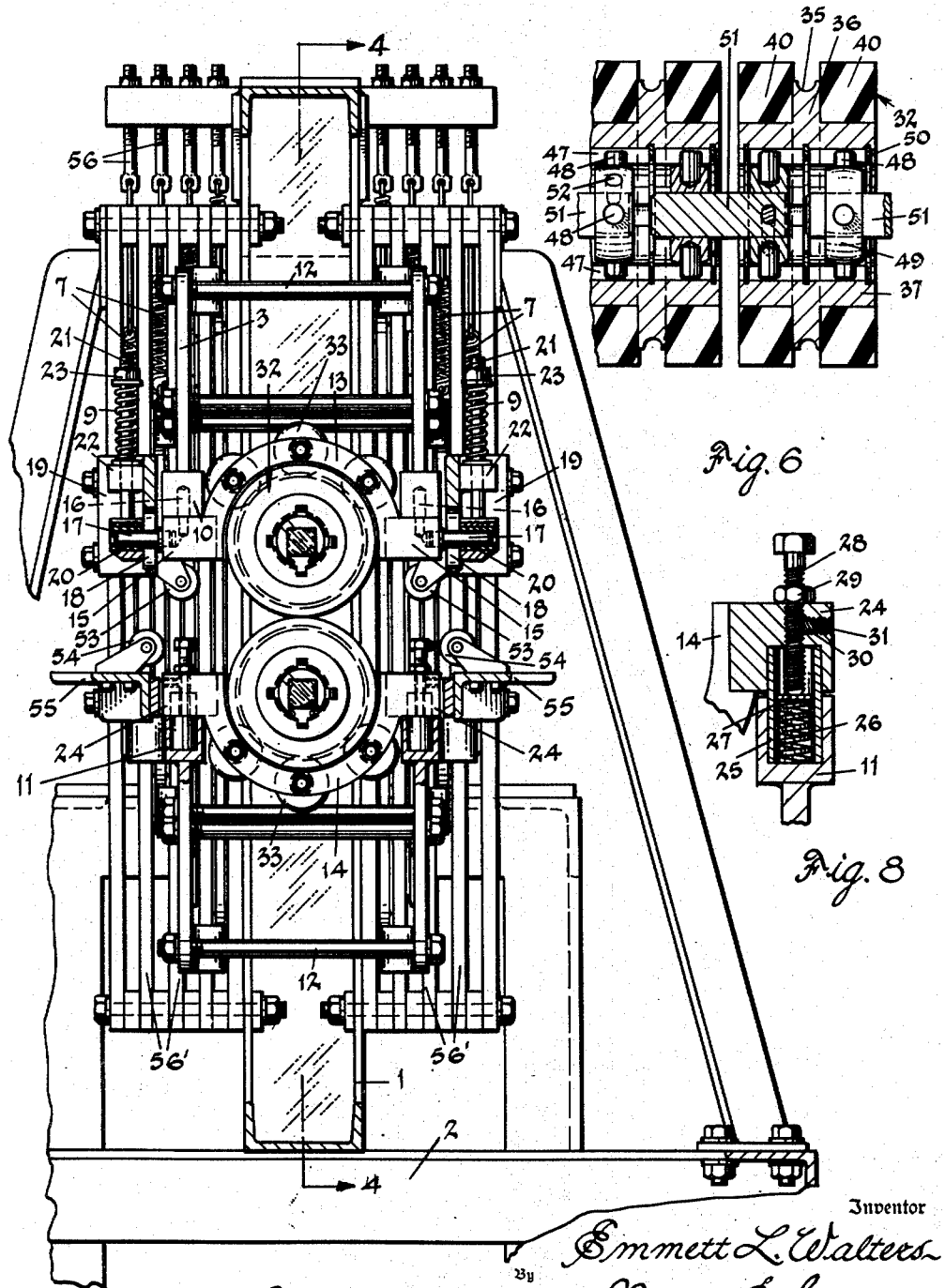
Figure 3 is a vertical section at enlarged scale as seen from the line 3—3 of Figure 1.
Figure 6 is an enlarged vertical section showing a pair of rollers and a universal driving connection therebetween.
Figure 8 is an enlarged fragmentary detail showing the resilient connection used to regulate the pressure exerted by the rollers.

An upper yoke 13 and a lower yoke 14 are carried from the jaws 10 and 11 of each of the pairs of C-shaped frames. As seen in Figure 3 the yoke 13 is semicircular in form having laterally extending ears 15 that are caught under the jaws 10 and secured thereto by dowels 16 fitted into the jaws 10 and the ears 15. The ends of the ears 15 are fitted with trunnions 17 that extend through vertical slots 18 cut in side plates 19 of the press framework 1. The side plates 19 are located above the path of the glass sandwiches being processed in the press. The ends of the trunnions 17 are received in and carried by bearings 20 rigidly attached to depending ends of vertically slidable bolts 21. The bolts 21 extend up through bearings 22 attached to the side plates 19. The frame supporting springs 9 are sleeved over the upper ends of the slidable support bolts 21 and, being held compressed between nuts 23 at the top ends of the bolts 21, serve to support the yoke 13 as well as the associated C-shaped frame.

The lower yoke 14 has laterally extending ears 24 that are supported on the lower jaws 11 of the C-shaped frames. The supporting connection between the jaws 11 and the ears 24 is shown in detail in Figure 8. This connection comprises a tube 25 that is slidably received in a vertical hole in the jaw 11 and in a similar hole in the lower surface of the ear 24. The tube 25 is approximately equal in length to the combined depths of the two holes and serves as a guide to maintain the yoke 14 in operative position on the associated jaw 11. A helical compression spring 26 enclosed within the tube 25 and thus in the hole in the jaw 11 is held compressed between the bottom of the hole in the jaw 11 and a spring seat 27 resting against the lower end of a tension adjusting bolt 28. The tension adjusting bolt 28 is threaded vertically through the ear 24 so as to extend downwardly along the center of the tube 25. The tension adjusting bolt 28 may be locked in position by tightening a jam nut 29 as well as being locked by a soft metal block 30 that is forced against the side of the thread of the bolt 28 by a set screw 31 screwed into the end of the ear 24.

A pair of rollers 32 are journaled or cradled on each set of yokes 13 and 14. To leave room for driving connections the rollers 32 are carried on a plurality of wheels 33 mounted in the yokes 13 and 14. (See also Figure 5.) Each of wheels 33 is formed with a rounded rim or periphery 34 that runs in a semicircular channel 35 cut in the periphery of a radially extending center flange 36 of a hub 37 of the supported roller 32. The wheels 33 are fitted with sleeve bearings 38 and are journaled on spacer bolts 39 set into the yokes 13 and 14.

The rollers 32 (Figure 6) are fitted with resilient tires 40 adapted to run on the glass sandwiches being pressed. The tires 40 are preferably made of rubber or other relatively soft elastic material that is capable of supplying the necessary total force without producing any localized high pressure points.

In this arrangement the rollers 32 are in effect cradled, the lower one on the wheels 33 of the lower yoke 14 and the upper one on the wheels 33 of the upper yoke 13 against which it is pressed by force transmitted through the lower one of the rollers 32. Thus the weight of the upper one of the rollers 32 is transmitted to the lower one of the rollers, through such roller to the yoke 14 and thus to the C-shaped frame 3 and through the frame to the ears 15 of the upper yoke 13 and thence to the trunnions 17 that are resiliently supported by the springs 9. The pressure with which the rollers 32 bear against each other is determined by the compression of the springs 25 that resiliently support the lower yoke 14 from the jaws 11 of the C-shaped frames.

In the operation of the roller press the rollers 32 must be driven by an external power source rather than being driven by the material being processed. In this press, referring to Figure 1, power is transmitted through a gear transmission box 41 to a pair of output shafts 42 each of which is equipped with a universal joint 43 (see also Figure 4). From the universal joints 43 the power is transmitted through splined or keyed shafts 44 to second universal joints 45. The output sections of these joints 45 are received in and rigidly secured to the hubs 37 of the first rollers 32 of each series of rollers. The output shafts of the second universal joints 45 are secured in the hubs 37 by means of taper pins 46 that are driven through sections of the hub 37 that extend axially beyond the tires 40. This driving connection through the universal joints permits the adjacent rollers 32 to shift out of alignment as may be required in accommodating the curvature of glass sheets without disrupting the flow of power to the rollers.

As may be seen in Figures 3 and 4 the rollers 32 are arranged in two series one located on either side of the glass and plastic sandwich being pressed. The rollers of each series are universally connected together so that rotary power applied through the universal joints from the power source may be transmitted from roller to roller along each series of rollers. A possible construction for the universal connections between the individual rollers is illustrated in Figures 3 and 6. Referring to these figures, it will be noticed that the bore of the hub 37 of each roller is provided with four grooves 47 in the nature of keyways and that these keyways or grooves 47 receive drive pins 48 that project radially from drive collars 49 fitted within the bores of the hubs 37. Each of the drive collars 49 is shaped like an equatorial zone of a sphere so that it may fit closely within the bore of the roller hub 37 even though its axis is not in alignment with the axis of the roller. The lateral movement of each of the drive collars 49 is limited by snap rings 50 set into the bores of the hubs 37.

There are two of the drive collars 49 located in each of the intermediate rollers 32 of each series of rollers and one of the drive collars in each of the terminal rollers. These drive collars 49 are interconnected in pairs in which the collars of each pair are in laterally adjacent rollers. These collars are connected by short square shafts 51 each having one end machined to cylindrical form and inserted into and pinned within one of the drive collars. Locking pins 52 anchoring rounded ends of the short shafts 51 into the cooperating drive collars 49 may be partially seen in Figures 3 and 6.

The squared end of each of the short interconnecting shafts 51 is slidably received in a broached square hole extending axially through the cooperating drive collar 49 of the next adjacent roller 32. These connections, in the nature of universal joints, allow each series of rollers to be driven in unison by power supplied to the end roller of the series as well as allow each series of rollers to vary its alignment and position within the framework 1 so as to accommodate any variations in transverse curvature of a glass and plastic sandwich being pressed. The curved exterior of each of the drive collars 49 permits it to operate with its axis out of alignment with the axis of the roller while the axially slidable freedom permitted by the square shaft engaging the square hole of the drive collar and the axial freedom of the drive collars themselves within the roller hub 37 allow the spacing of the rollers to vary without affecting the driving connection therebetween.

In the operation of this apparatus the glass sandwiches to be pressed are guided into the space between the cooperating series of rollers 39 and to facilitate this feeding of the sandwiches upper and lower guide rollers 53 and 54 are provided, the upper rollers 53 being journaled in brackets attached to the cross members 19 of the press while the rollers 54 are journaled in brackets erected from lower cross members 55 of the press framework 1. As the glass enters the space between the cooperating driven rollers 32 these rollers shift vertically by movement of the trunnions 17 in the slots 18 until the rollers, as shown in Figure 4, conform to the transverse curvature of the glass sandwiches being pressed. The glass is not called upon to support the weight of the rollers but such weight is rather carried on the springs 9 which are preferably of considerable length and low rate so that they nearly counterbalance the weight of the roller assemblies regardless of the vertical elevation of such assemblies. This counterbalancing of weight substantially independently of the height of the assembly is necessary to prevent setting up transverse bending stresses in the glass sandwiches being pressed.

This shifting of roller assemblies in a direction generally perpendicular to the glass sandwiches being pressed is alone not sufficient to provide satisfactory operation of the equipment. It is found necessary that the axes of the individual rollers of each pair, regardless of the transverse curvature of the glass, take up positions that are substantially parallel to that portion of the glass sandwich being pressed between the individual rollers of each pair. This means that each of the C-shaped frames must, in addition to the movement permitted by the trunnions 17 sliding within the slots 18, be capable of rotation about such trunnions 17 until the axes of the rollers 32 are parallel to the surface of the glass. This motion which is a combination of rotation and translation is taken care of by supporting the back ends of each of the C-shaped frames by means of the springs 7. These springs are of low rate so that small torque effects or unevenness of pressure exerted by the rollers may shift the frames through whatever rotation is required. Adjusting bolts 56 carrying the upper ends of the springs 7 allow the initial angular position of the C-shaped frames to be set according to the average transverse curvature of the glass sandwiches being pressed.

The C-shaped frames 3, 4, 5 and 6 are restrained from movement in the direction of motion of the glass sheets. This restraint at the yoke supporting ends of the frames is provided by the side members 19 and 55 which are located alongside the ends of the ears 15 and 24 of the yokes 13 and 14. The vertical extent of the cooperating surfaces of the side members and the ears is equal to or greater than the length of the slots 18 in which the trunnions 17 slide so there is no danger of disengagement of these surfaces. The back sides of the C-shaped frames, which, by offsetting of the arms, lie in parallel planes, are loosely interleaved with rigid guide plates 56' (Figure 3) of the framework 1. To minimize the rubbing friction, wear plates 57 (Figure 2) are welded to the sides of the C-shaped frames to hold these frames spaced from the guide plates 56'. These guide plates 56' by engaging the wear plates 57 at the top and bottom of the C-shaped frames prevent any cocking or binding of the frames that would limit their free mobility for alignment with the glass sheets.

The rotational movement of the C-shaped frames may also be promoted by arranging the initial positions such that all of the rollers 32 when pressing a sheet of glass are moved in a direction toward the concave side of the glass with the center rollers moving a greater distance than the end rollers. Arranged in this manner the points of attachment of the springs 7 to the C-shaped frames do not move appreciably in space but rather act as fulcrums about which the frame may turn as the trunnions 17 move in the slots 18. By this arrangement the series of rollers 32, which are held in accurate alignment in pairs by the C-shaped frames and the wheels 33, are permitted to shift in alignment according to the various transverse curvatures of the glass sheet or sandwich and thus permit high pressing pressures to be exerted on the sandwich without exerting high bending forces tending to break the glass.

Various modifications of the mounting and driving structure for the rollers 32 may be made without departing from the spirit and scope of the invention.

Having described the invention, I claim:

1. In apparatus for pressing the sheets of a glass and plastic sandwich into intimate contact, in combination, a plurality of generally C-shaped frames arranged in nested relation to one another, means for individually resiliently supporting said frames in nested alignment and such that each embraces a portion of the path along which the sandwiches are moved, a pair of rollers journaled on each C-shaped frame to bridge the open side thereof, each of said rollers being formed to cooperate with the other roller of the pair to press the sandwich therebetween, and means for rotating the rollers.

2. In apparatus for pressing the sheets of a glass and plastic sandwich into intimate contact, in combination, a plurality of generally C-shaped frames arranged in pairs, means for rigidly interconnecting the frames of each pair, means for supporting each pair of frames such that each embraces a portion of the path along which the sandwiches are moved, yokes extending parallel to the path and interconnecting the ends of the frames of each pair, rollers journaled in the yokes, and means for rotating the rollers.

3. In apparatus for pressing the sheets of a glass and plastic sandwich into intimate contact, in combination, a plurality of rollers arranged in two series each extending transversely of the path of the sandwich, universal driving connections between the adjacent rollers in each series, said series of rollers being located one on either side of the path of the sandwich to bear against the sandwich, a plurality of frames individually yieldably supported one for each pair of opposing rollers of the series of rollers and means on said frames for journaling the rollers.

4. In apparatus for pressing the sheets of a glass and plastic sandwich into intimate contact, in combination, a plurality of generally C-shaped frames that are resiliently supported and that are interconnected in pairs, a pair of yokes carried at the open ends of the C-shaped frames and connecting similar parts of the C, guide wheels journaled in the yokes, a pair of rollers that are cradled on the guide wheels and urged thereby toward each other to press a sandwich passing therebetween, and means for driving the rollers.

5. In apparatus for pressing sheets of a glass and plastic sandwich into intimate contact, in combination, a plurality of generally C-shaped frames arranged in nested relation to one another to embrace the path along which the sandwiches are moved, rollers carried in the open ends of the C-shaped frames and arranged to bear on the surfaces of a sandwich passing therebetween, means for driving the rollers, means for resiliently supporting each frame and restricting it to movement in a plane generally perpendicular to the path of the sandwich, and means for guiding an end of each frame along a line generally perpendicular to the surface of a sandwich passing between the rollers.

6. In apparatus for pressing sheets of a glass and plastic sandwich into intimate contact, in combination, a plurality of frames arranged in nested relation to one another and adapted to embrace the sandwich, a pair of rollers carried on each frame and yieldably urged against a sandwich passing therebetween, means for driving the rollers, a guide for each frame, the guide being located adjacent a roller to limit that point of the frame to movement generally perpendicular to the surface of a sandwich being pressed, and means for resiliently supporting the frame for rotation and translation in a plane generally perpendicular to the path of the sandwich passing between the rollers.

7. In apparatus for pressing sheets of a curved glass and plastic sandwich into intimate contact, in combination, a plurality of frames arranged in nested relation to one another and adapted to embrace the sandwich, a pair of rollers carried on each frame and yieldably urged against a sandwich passing therebetween, means for driving the rollers, a guide for each frame, the guide being located adjacent that one of the rollers that bears on the concave side of the sandwich to limit that point of the frame to movement generally perpendicular to the surface of the sandwich being pressed, and means for resiliently supporting the frame for limited rotation and translation in a plane generally perpendicular to the path of the sandwich passing between the rollers.

8. In apparatus for pressing sheets of a curved glass and plastic sandwich into intimate contact, in combination, a plurality of rollers each having a resilient tire and a track, universal connections affording driving connections between the rollers, said rollers being arranged in two series, means for driving at least one series of said rollers, a plurality of frames, yokes carried in the frames, a plurality of wheels journaled in each yoke and engaging the track of a roller of one of said series to urge said roller toward a corresponding roller of the other series, and means for resiliently supporting the frames so that the frames and rollers may conform to the transverse curvature of the sandwich passing between the rollers.

9. In apparatus for pressing sheets of a curved glass and plastic sandwich into intimate contact, in combination, a plurality of rollers each having a pair of resilient tires and a track between the tires, a plurality of frames, a plurality of wheels engaging the tracks of a pair of rollers to urge the rollers toward each other, universal driving connections between the rollers, means for driving the rollers, and a spring contributing to the support of each frame, whereby each frame carrying a pair of rollers may shift relative to its neighbors to conform to the curvature of the sandwich.

10. In apparatus for pressing sheets of a curved glass and plastic sandwich into intimate contact, in combination, a plurality of rollers each having a resilient tire, said rollers being arranged in two series, universal driving connections between rollers of each series, means for driving the rollers, a plurality of frames mounted in nesting relation to one another, means in each frame for journaling a pair of rollers one from each series with the rollers urged toward each other, means for resiliently supporting each frame so that the frames and rollers may shift to accommodate transverse curvature of the sandwich, and a resilient member included in each frame to allow relative movement between the rollers of a pair to accommodate variations in thickness of the sandwiches being pressed.

11. In apparatus for pressing the sheets of a glass and plastic sandwich into intimate contact, in combination, a plurality of generally C-shaped frames, rollers journaled from the frames and closing the open sides thereof for pressing a sandwich embraced by the frames, means for driving the rollers, resilient means for individually supporting each of the frames, and stationary guide means extending generally perpendicular to the path of the sandwich between which means portions of the frames are loosely interleaved, whereby said frames are guided for movement in a plane generally perpendicular to the sandwich being pressed.

EMMETT L. WALTERS.

REFERENCES CITED

The following references are of record in the file of this patent:

UNITED STATES PATENTS

| Number | Name | Date |
|---|---|---|
| 1,656,828 | Powell | Jan. 17, 1928 |
| 1,801,270 | Gray | Apr. 21, 1931 |
| 1,938,216 | Damerell | Dec. 5, 1933 |
| 2,059,578 | Henning | Nov. 3, 1936 |
| 2,202,670 | Owen | May 28, 1940 |
| 2,334,651 | Schafer | Nov. 16, 1943 |